United States Patent
Carlsson et al.

(10) Patent No.: US 7,908,859 B2
(45) Date of Patent: Mar. 22, 2011

(54) EXHAUST GAS RECIRCULATION MIXER FOR A TURBO-CHARGED INTERNAL COMBUSTION ENGINE

(75) Inventors: Annika Carlsson, Kungälv (SE); Stanimir Blagic, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 534 days.

(21) Appl. No.: 12/093,061

(22) PCT Filed: Nov. 29, 2005

(86) PCT No.: PCT/SE2005/001798
§ 371 (c)(1),
(2), (4) Date: May 8, 2008

(87) PCT Pub. No.: WO2007/064254
PCT Pub. Date: Jun. 7, 2007

(65) Prior Publication Data
US 2008/0264060 A1 Oct. 30, 2008

(51) Int. Cl.
F02B 33/44 (2006.01)
F02M 25/07 (2006.01)
F02M 35/10 (2006.01)

(52) U.S. Cl. .................. 60/605.2; 123/568.17

(58) Field of Classification Search .............. 60/605.2; 123/568.17; F02M 25/07, 35/10
See application file for complete search history.

(56) References Cited

U.S. PATENT DOCUMENTS

| | | | | |
|---|---|---|---|---|
| 2,084,142 | A | * | 6/1937 | Horton ............. 123/568.11 |
| 5,207,714 | A | | 5/1993 | Hayashi et al. ....... 123/568.17 |
| 5,533,487 | A | * | 7/1996 | Cailey ............. 123/568.17 |
| 6,502,397 | B1 | * | 1/2003 | Lundqvist ............ 60/605.2 |
| 7,281,530 | B2 | * | 10/2007 | Usui ............... 123/568.17 |
| 7,353,811 | B2 | * | 4/2008 | Weisz ............. 123/568.17 |
| 7,654,078 | B2 | * | 2/2010 | Marsal et al. ........... 60/278 |
| 7,798,135 | B2 | * | 9/2010 | Bischofberger et al. . 123/568.17 |
| 2002/0112708 | A1 | | 8/2002 | Fischer et al. ....... 123/568.17 |

FOREIGN PATENT DOCUMENTS

| | | |
|---|---|---|
| DE | 10019409 C1 * | 8/2001 |
| DE | 10202612 A1 | 7/2003 |
| FR | 2719870 A1 | 11/1995 |
| JP | 2000161146 A * | 6/2000 |
| WO | 02070888 A1 | 9/2002 |

OTHER PUBLICATIONS

International Search Report from corresponding International Application PCT/SE2005/001798, having date of actual completion on Jun. 2, 2005.
International Preliminary Report on Patentability from corresponding International Application PCT/SE2005/001798 , having date of completion on Mar. 10, 2008.

* cited by examiner

*Primary Examiner* — Thai Ba Trieu
(74) *Attorney, Agent, or Firm* — WRB-IP LLP

(57) ABSTRACT

An EGR mixer arrangement for mixing gas into the intake air of a turbocharged internal combustion engine is provided. The arrangement includes an inlet port with connection for a branch pipe, which with an insertion section opens out into the inlet port. The insertion section forms a diffuser vane with a surface which is positively double-bent in the direction of flow of the intake air and which extends in a curved shape in the flow direction of the inlet port.

6 Claims, 2 Drawing Sheets

EXHAUST GAS RECIRCULATION MIXER FOR A TURBO-CHARGED INTERNAL COMBUSTION ENGINE

BACKGROUND AND SUMMARY

The present invention relates to an EGR mixer arrangement for mixing the gas into the intake air of a turbocharged internal combustion engine, comprising an inlet port with connection for a branch pipe, which with an insertion section opens out into the inlet port.

The recirculation of exhaust gases, so-called Exhaust Gas Recirculation (EGR), is a commonly known method of influencing the combustion in internal combustion engines and means that a proportion of the total exhaust gas flow from the engine is returned in a secondary flow to the intake side of the engine where it is mixed with the intake air for delivery into the engine cylinders. When combustion occurs with a reduced oxygen content, due to EGR admixture, the combustion temperature is reduced. This makes it possible to reduce the quantity of nitrogen oxides (NOx) in the exhaust gas emissions discharged into the surrounding environment.

The quantity of EGR gas that can be transferred from the exhaust side to the intake side of a turbocharged internal combustion engine varies, among other things, as a function of the pressure prevailing on the intake side and on the exhaust side, and on the design configuration of the EGR mixer arrangement for mixing the gas into the intake air. This arrangement should therefore be designed for a minimum pressure fall both of the intake air and of the EGR gas. The arrangement should furthermore be capable of distributing the pulsed supply of EGR gas as uniformly as possible to all engine cylinder chambers. Unfortunately, in internal combustion engines for heavy trucks there is generally a lack of space in the engine compartment. It is therefore a problem to provide an EGR mixer arrangement which fulfills the efficiency requirements whilst at the same time being compact.

It is desirable therefore to provide a compact and efficient exhaust gas recirculation mixer arrangement.

An arrangement according to an aspect of the present invention comprises an inlet port with connection for a branch pipe, which with an insertion section opens out into the inlet port, and according to the invention is characterized in that the insertion section forms a diffuser vane with a surface which is positively double-bent in the direction of flow of the intake air and which extends in a curved shape in the flow direction of the inlet port. This design of the mixer arrangement achieves an efficient mixing of the EGR gas into the intake air over a short section of the port.

Advantageous exemplary embodiments of the invention are set forth in the following description.

BRIEF DESCRIPTION OF THE DRAWINGS

The invention will be described in more detail below with reference to exemplary embodiments shown in the drawings attached, in which.

DETAILED DESCRIPTION

Figure 1:
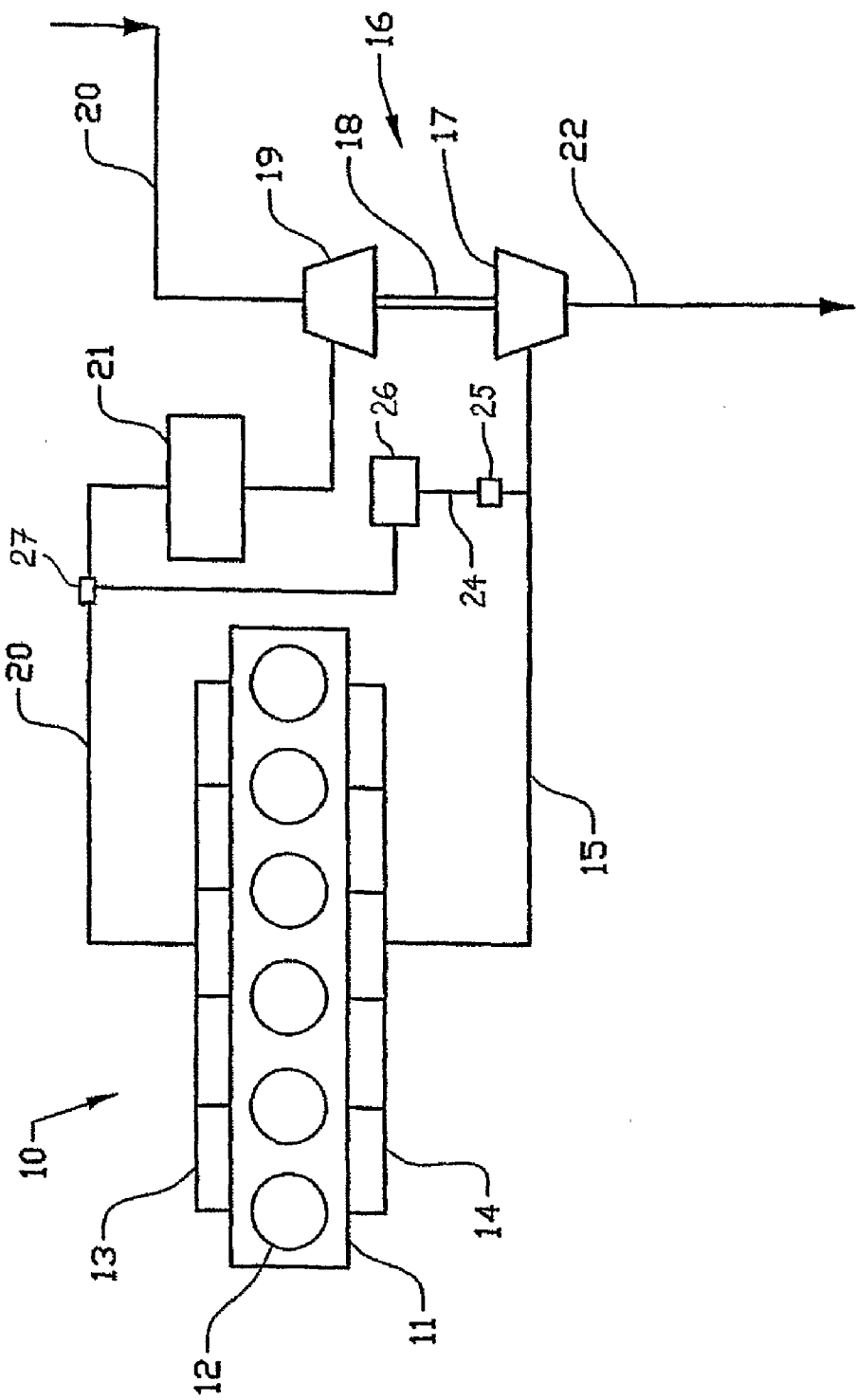
FIG. 1 shows a schematic representation of an internal combustion engine with EGR cycle, in which the mixer arrangement according to the invention can be applied.

The internal combustion engine 10 represented schematically in FIG. 1 comprises an engine block 11 having six piston cylinders 12 with an inlet manifold 13 and an exhaust manifold 14. Exhaust gases are led via an exhaust pipe 15 to the turbine rotor 17 of a turbocharger unit 16. The turbine shaft 18 drives the compressor wheel 19 of the turbocharger unit, which via an intake line 20 compresses intake air and delivers this via an intercooler 21 to the inlet manifold 13. Fuel is fed to each cylinder 12 by way of injectors (not shown).

Exhaust gases that have passed through the turbocharger unit 16 are led into the atmosphere via the exhaust line 22. Exhaust gases are also returned to the intake side of the engine as so-called EGR gas, via a pipeline 24, for reduction of the engine nitrogen oxide emissions in accordance with the state of the art. This line comprises a valve 25, which serves as regulating valve for regulating the EGR flow. In addition there is a cooler 26 for cooling the EGR gases. The pipeline 24 for EGR gas is connected to the intake line 20 by means of a mixer arrangement 27, which will be described in more detail below.

Figure 2:
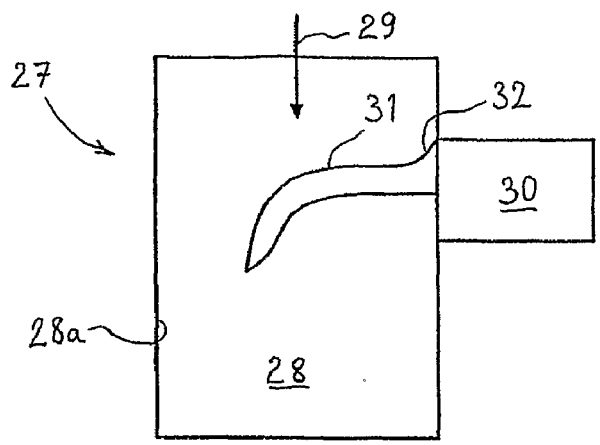
FIG. 2 shows a schematic representation of the mixer arrangement according to the invention.

The mixer arrangement is represented schematically in FIG. 2 and comprises an inlet port 28 for intake air which flows in the direction of the arrow 29. In addition, the mixer arrangement comprises a branch pipe 30 for connection to the EGR line 24. The branch pipe 30 has a circular cross section and with an insertion section 31 opens out into the inlet port 28. The insertion section forms a diffuser vane with positively double-bent surface, which extends in a curved shape in the flow direction of the inlet port.

Figure 3:
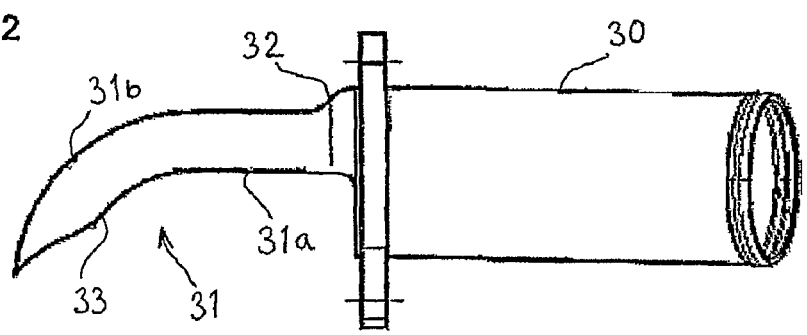
FIGS. 3 and 4 are two side views of the insertion of the mixer arrangement, viewed from different angles.
Figure 4:
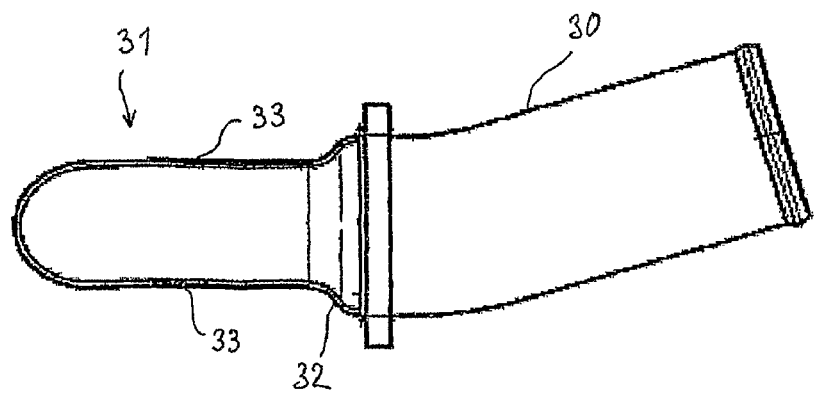

The insertion section is shown on a larger scale in FIGS. 3 and 4 and is designed so that, in a section which substantially coincides both with the central axis of the inlet port and with the central axis of the branch pipe, it extends in a curved shaped from the part of the branch pipe 30 situated nearest the upstream end of the inlet port to a point between the central axis of the inlet port and the wall 28a of the inlet port. Viewed in cross section through the insertion section/diffuser vane 31, this curves towards the inside of the bend and is of a width which is less than the diameter of the branch pipe.

The diffuser vane 31 may be formed, for example, by a pipe section having a smaller diameter than the branch pipe, which connects to the branch pipe 30 by way of a collar section 32. A first section 31a of the diffuser vane is straight and forms a transition to the curved section 31b. The radially inner half segment of the pipe section is cut away in such a way that the remaining part has a cross section with a circular segment having an angular width not exceeding approximately 180 degrees.

The design of the insertion section 31 described above serves to minimize the pressure fall created by the insertion section in the inlet port 28. This is due to the fact that the insertion section has been made narrower than the branch pipe 30, whilst the surfaces nearest the end edges 33 of the diffuser vane are essentially parallel to the flow direction 29 of the intake air, which reduces the swirling produced as the intake air passes these edges 33. This is also the case at the pointed end of the insertion section. The fact that the insertion section is curved and completely open on the downstream side means that the EGR gas can be mixed into the intake air over the entire length of the insertion section, that is to say along the end edges 33. At the same time the part of the EGR flow that follows the inside of the insertion section can flow unimpeded along this surface, imparting to it a direction of flow which coincides with the flow direction 29 of the intake air. Due to its kinetic energy, a proportion of the EGR gas can thereby travel far into the mixer arrangement 27 before being mixed up with the intake air. The arrangement described above therefore achieves an effective dispersal of the EGR gas in the intake air, which is advantageous in reducing environmentally harmful emissions. A further advantage with the design of the mixer arrangement according to the invention is that the EGR gas flow is simply directed away from the wall 28a opposite the branch pipe 30, so that rebounding of the gas flow is avoided, so as to minimize the pressure fall and to prevent soot particles in the EGR flow reaching said wall section.

The invention must not be regarded as being limited to the exemplary embodiments described above, a number of further variants and modifications being feasible without departing from the scope of the following patent claims.

The invention claimed is:

1. An EGR mixer arrangement for mixing exhaust gas into intake air of a turbocharged internal combustion engine, comprising an inlet port with a connection for a branch pipe which comprises an insertion section that opens out into the inlet port, wherein the insertion section forms a diffuser vane with a surface which is positively double-bent in a direction of flow of the intake air and which extends in a curved shape in a flow direction of the inlet port.

2. The arrangement as claimed in claim 1, wherein a section which substantially coincides both with a central axis of the inlet port and with a central axis of the branch pipe the insertion section extends from a part of the branch pipe situated nearest an upstream end of the inlet port to a point between the central axis of the inlet port and a wall of the inlet port.

3. The arrangement as claimed in claim 1, wherein the insertion section has a cross section which curves towards an inside of a bend of the insertion section.

4. The arrangement as claimed in claim 1, wherein the branch pipe has a circular cross section and that a width of the insertion section is less than a diameter of the branch pipe.

5. The arrangement as claimed in claim 4, wherein a cross section of the insertion section essentially corresponds to a circular segment having an angular width not exceeding approximately 180 degrees.

6. The arrangement as claimed in claim 1, wherein the insertion section is formed by an at least partially curved pipe section, a radially inner half segment of which pipe section having been cut away and which is connected to the branch pipe by way of a collar section.

* * * * *